United States Patent
Balboni et al.

(10) Patent No.: US 6,800,818 B2
(45) Date of Patent: Oct. 5, 2004

(54) DISTRIBUTOR UNIT

(75) Inventors: Gianni Balboni, Molinella (IT); Claudio Trebbi, Medicina (IT)

(73) Assignee: I.M.A. Industria Macchine Automatiche S.p.A., Bologna (IT)

( * ) Notice: Subject to any disclaimer, the term of this patent is extended or adjusted under 35 U.S.C. 154(b) by 142 days.

(21) Appl. No.: 10/276,026

(22) PCT Filed: May 16, 2001

(86) PCT No.: PCT/IB01/00871
§ 371 (c)(1),
(2), (4) Date: Nov. 12, 2002

(87) PCT Pub. No.: WO01/88698
PCT Pub. Date: Nov. 22, 2001

(65) Prior Publication Data
US 2003/0102169 A1 Jun. 5, 2003

(30) Foreign Application Priority Data
May 19, 2000 (IT) .................................... BO2000A0306

(51) Int. Cl.$^7$ .............................................. G01G 13/02
(52) U.S. Cl. ............................ 177/52; 177/145; 141/83
(58) Field of Search ........................ 177/52, 119, 145; 141/83; 222/55, 56, 77

(56) References Cited

U.S. PATENT DOCUMENTS

| | | | | |
|---|---|---|---|---|
| 4,344,493 A | | 8/1982 | Salmonsen et al. ............ | 177/52 |
| 4,407,379 A | * | 10/1983 | Pryor et al. .................... | 177/52 |
| 5,004,093 A | * | 4/1991 | Blezard ....................... | 198/430 |
| 5,092,414 A | * | 3/1992 | Blezard ........................ | 177/52 |
| 6,096,983 A | * | 8/2000 | Ozaki et al. .................. | 177/52 |
| 6,627,826 B2 | * | 9/2003 | Cavina et al. ............... | 177/145 |

FOREIGN PATENT DOCUMENTS

| | | |
|---|---|---|
| EP | 0 274 797 A | 7/1988 |
| EP | 0 399 254 | 11/1989 |
| EP | 0 405 807 A | 1/1991 |
| EP | 0 636 574 A | 2/1995 |

* cited by examiner

Primary Examiner—Randy Gibson
(74) Attorney, Agent, or Firm—William J. Sapone; Coleman Sudol Sapone, P.C.

(57) ABSTRACT

A distributor unit (D) includes a stepwise moving conveying line (L) for conveying containers (C) through one filling unit (G), where the containers (C) are filled with a predetermined filling liquid or powder substance. In a weighing station (15,16), associated to the conveying line (L), two weighing groups (11,12) are situated on opposite sides of the conveying line (L) and have one weighing area (14a,14b) for weighing a container (C). One transfer group (30) is associated to the weighing station (15,16) and moves crosswise to the conveying line (L). The transfer group (30) transfers containers ($C_i$) to be weighed from the conveying line (L) to the weighing area (14b) of one of the weighing groups (12), and transfers at the same time an already weighed containers ($C^*_{i-1}$) from the area (14a) of the other weighing group (11) to the conveying line (L).

6 Claims, 4 Drawing Sheets

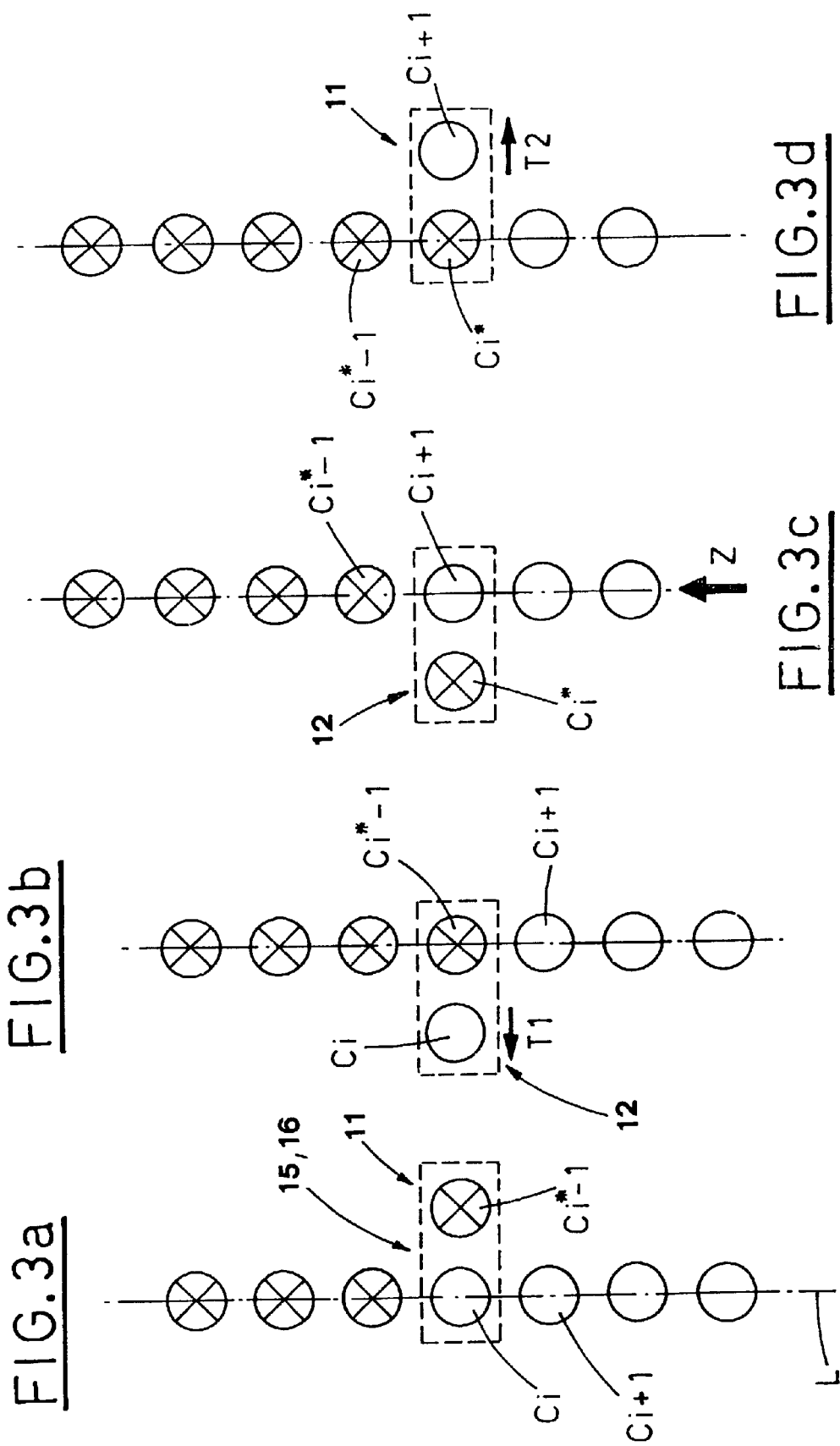

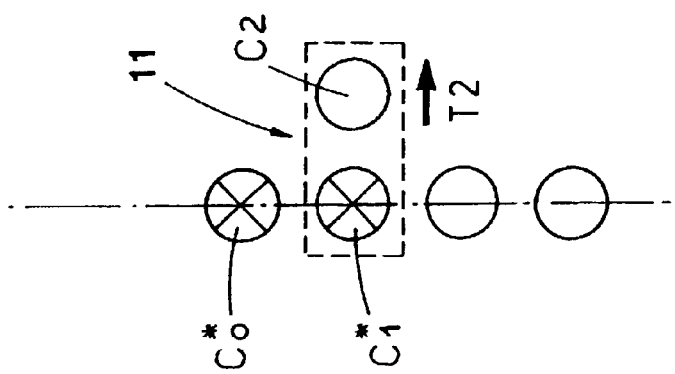
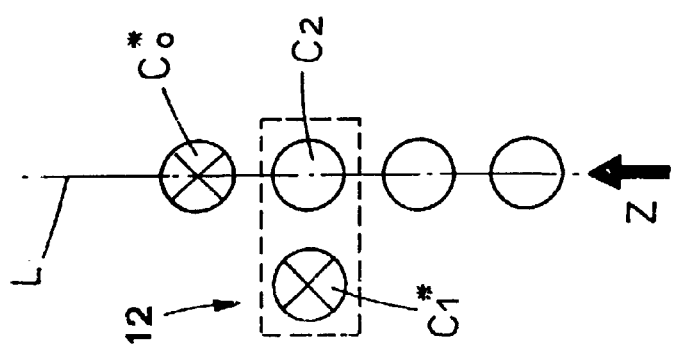
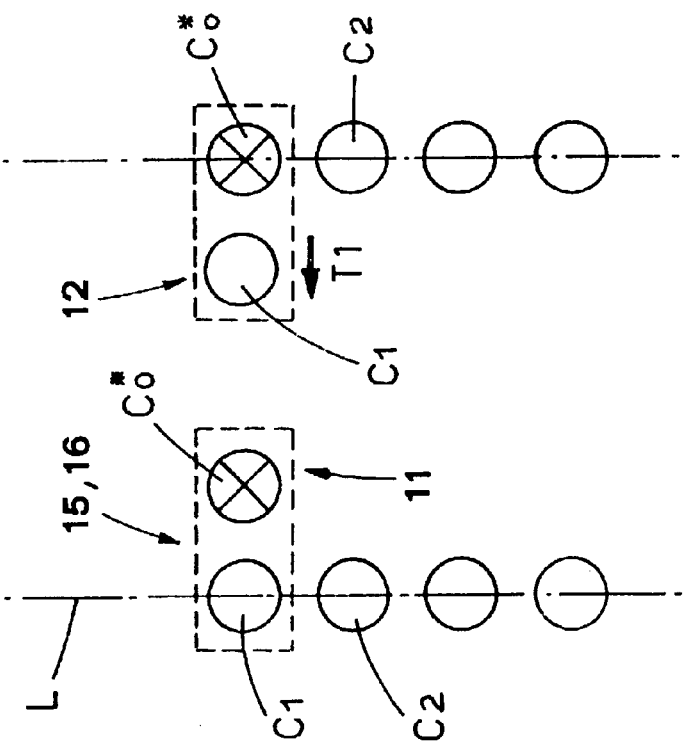

DISTRIBUTOR UNIT

BACKGROUND OF THE INVENTION

The present invention relates to units for filling containers, in particular bottles, with liquid or powder substances, in pharmaceutical field, e.g. medicines, or in cosmetics, e.g. perfumes.

More in particular, the present invention relates to a distributor for controlled filling of containers by checking the weight of the substance introduced therein.

DESCRIPTION OF THE PRIOR ART

It is known that it is necessary to respect strict weighing principles while filling bottles or containers with e.g. medicines, since the introduced substance must have a precise weight or volume.

Consequently, the tolerances admitted during containers filling and batching steps are very restricted. It is therefore necessary to verify the weight of containers coming out from the filling station.

According to this procedure, sample containers are selected from the conveying line at selected time intervals and weighed.

If the container weight does not fall within the admitted tolerance, the product quantity delivered at the filling station is adjusted.

After having been removed from the conveying line and weighed, the sample container is rejected.

The sample containers must be rejected, because difficulties and constructive problems of suitable operating means, which allow to recycle the rejected containers, have not been resolved yet.

The statistical weighing technique allows to weigh the containers very precisely out of the conveying line, however, it does not allow their reintroduction in the productive cycle.

Moreover, since the check is performed on statistical basis, it is possible that, after being packaged and sealed, the weight of some containers does not fall within the admitted tolerances.

According to another method, used at present, the containers are weighed directly on the conveying line, at the outlet of the station for filling the containers.

The conveying line features, arranged in predetermined positions and at predetermined space intervals, suitable weighing stations positioned in the regions of indentations or breaks of the conveying line.

Although this weighing method allows to check the weight of all containers coming out of the filling station, on the conveying line, it presents some operation problems with the detection of the containers actual weight.

The positioning of the weighing stations directly on the conveying line, which must move forward with a predetermined speed to maintain best production rate, can cause some weighing problems due to inertia.

Actually, it is difficult for the containers to get settled and steady in the weighing station within a time sufficient to acquire a precise measure.

An operation unit for feeding containers which allows to feed containers along a conveying line and to transfer them from the conveying line to a weighing station, situated along the conveying line, is disclosed in the Italian Patent Application No. BO2000A 000147 of the same Applicant.

SUMMARY OF THE INVENTION

The main object of the present invention is to propose a distributor unit, which allows to avoid the problems occurring in the prior art, and more precisely, a distributor unit, which allows to weigh the substance introduced into the containers in an extremely precise and effective way.

Another important object of the present invention is to propose a distributor unit which enables to weighing all the containers, completely clear of the conveying line, and reintroducing the weighed containers thereto.

A further object of the present invention is to propose a distributor unit, which rejects containers, whose weight does not fall within the admitted tolerance.

The above mentioned objects are obtained, in accordance with the contents of the claims, by a liquid substance distributor unit including:

a conveying line, which moves forward stepwise, so as to convey containers in a forward direction;

at least one filling unit, where said containers are filled with a liquid substance;

at least one weighing station, associated to said conveying line;

said distributor unit (D) being characterized in that said weighing station includes, in combination:

at least one first weighing station, situated upstream of said filling unit with respect to said forward direction (Z) of said line, so as to weigh the containers before filling;

at least one second weighing station, situated downstream of said filling unit, with respect to said forward direction of said line, so as to weigh containers after filling;

a control unit, interfaced with said first weighing station and with said second weighing station, so as to acquire the weight of said containers, respectively before and after filling, and determine the net weight of the substance introduced in each container;

with each one of the above mentioned first and second weighing stations including:

a first weighing group and a second weighing group situated on opposite sides of said conveying line;

at least one weighing area for each of said first weighing group and second weighing group, for weighing a container conveyed by the conveying line;

at least one transfer group for transferring, during a conveying line stop, containers to be weighed from said conveying line to the weighing area of said second weighing group, and for transferring, at the same time, an already weighed containers from the first weighing group to said conveying line;

said transfer group transferring, during a next stop of said conveying line, further containers to be weighed from said conveying line to the weighing area of said first weighing group, and transferring at the same time, an already weighed containers from said weighing area of said second weighing group to said conveying line.

BRIEF DESCRIPTION OF THE DRAWINGS

The characteristic features of the present invention will be pointed out in the following description of a preferred, but not only embodiment, with reference to the enclosed drawings, in which.

FIGS. from 3a to 3d show working steps, according to a functional scheme, of weighing the containers present on the conveying line of the proposed distributor unit, while FIGS. from 4a to 4d show working steps, according to a functional scheme, of weighing when the distributor unit is operated.

BEST MODES OF CARRYING OUT THE INVENTION

Figure 1:
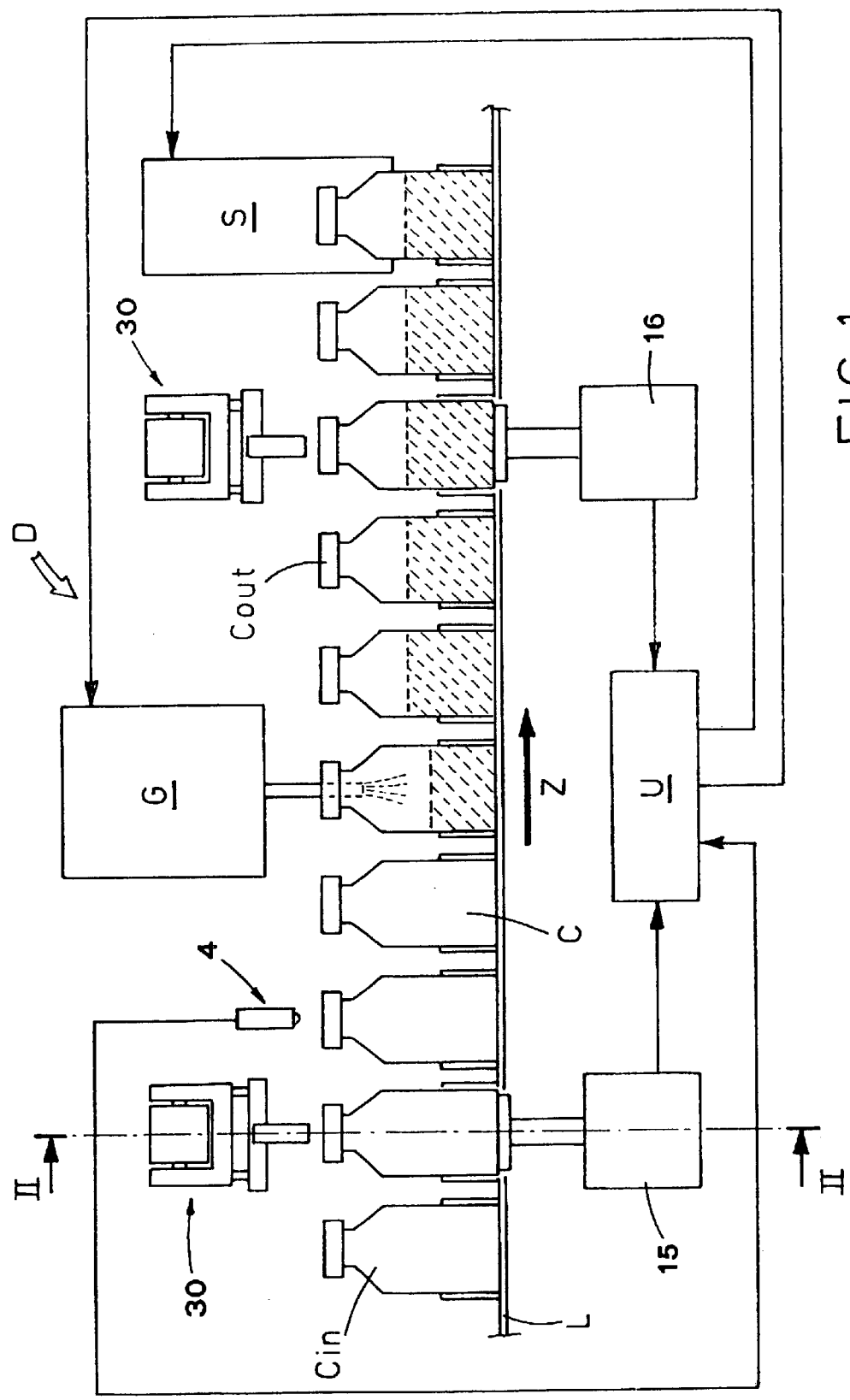
FIG. 1 is a schematic front view of the proposed distributor unit as a whole.

With reference to the enclosed drawings, in particular FIG. 1. the distributor unit, proposed by the present invention, is indicated with reference numeral D.

The distributor unit D includes a conveying line L, which moves containers C stepwise in a horizontal direction Z, so as to move the containers to a filling unit G, which fills the containers C with a predetermined liquid substance.

The distributor unit D includes also, upstream of the filling unit G, a first weighing station 15, and downstream of the filling unit G, a second weighing station 16.

The containers $C_{IN}$, which enter the filling unit G, are weighed in the first weighing station 15, before being filled, so as to determine the weight of the empty containers, or tare weight.

The containers $C_{OUT}$, which leave the filling unit G, are weighed in the second weighing station 16, after filling, so as to determine the containers gross weight.

Each of the weighing stations, first weighing station 15 and second weighing station 16, is equipped with e.g. a pair of weighing groups, namely a first weighing group 11 and a second weighing group 12.

Figure 2A:
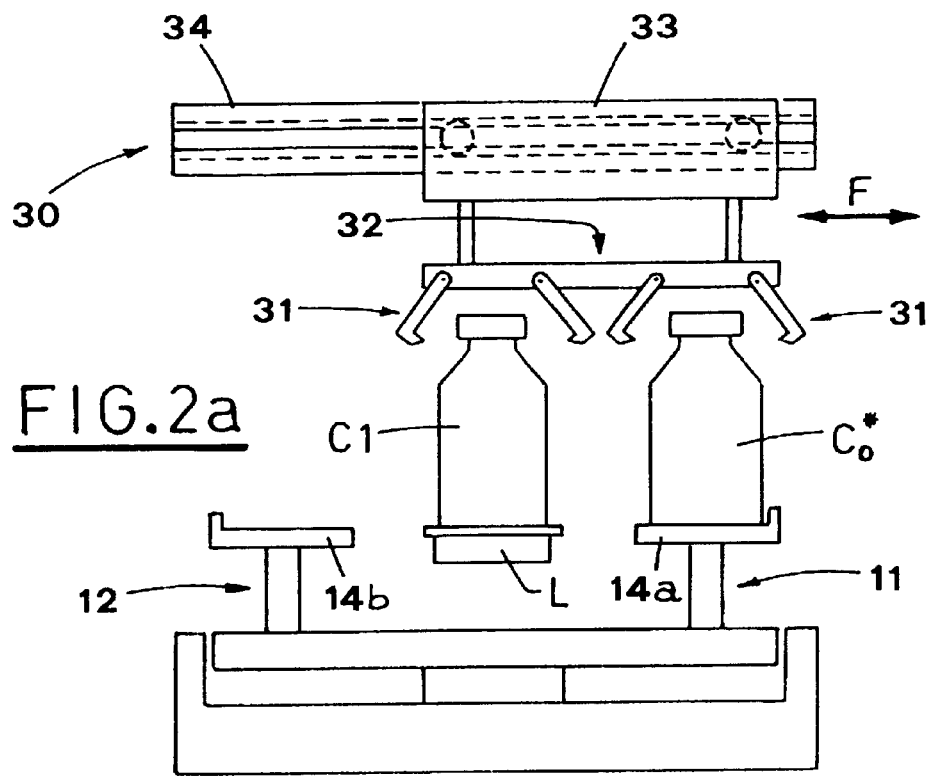
FIGS. 2a and 2b are section views, taken along the II—II of FIG. 1, of basic elements of the proposed distributor unit, in two different operation configurations.
Figure 2B:
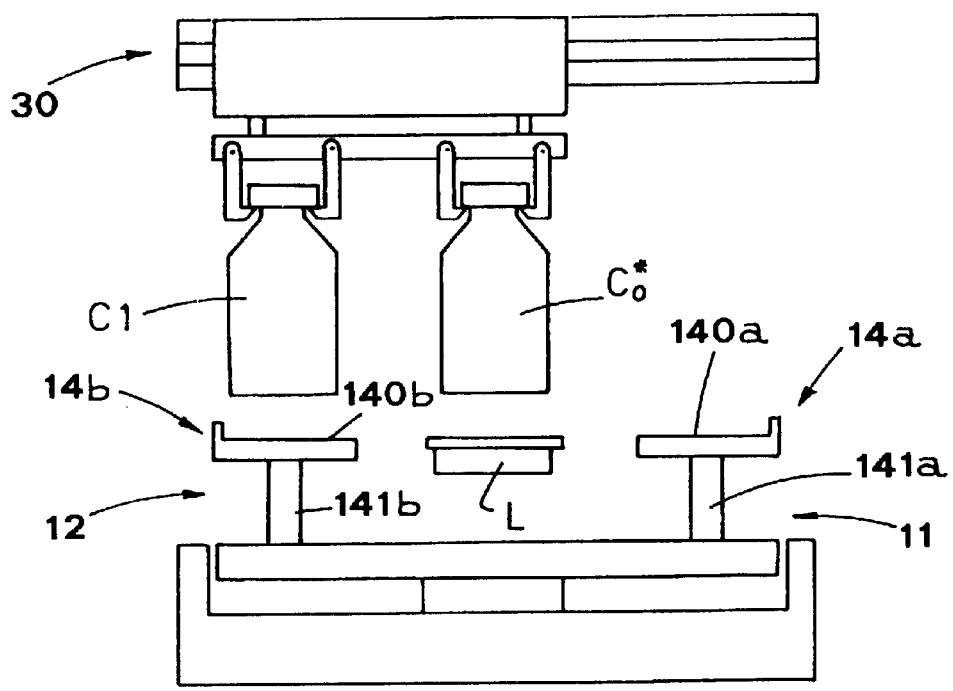

The first weighing group 11 and second weighing group 12, as shown in detail in FIGS. 2a and 2b, are situated external to the conveying line L, facing and parallel to each other.

Each of the first and second weighing groups 11 and 12, is equipped with at least one weighing area, a weighing area 14a and a weighing area 14b, respectively, which receives a corresponding container C and weighs it.

In particular, for sake of clarity, FIGS. 2a and 2b show only one of the weighing areas 14a and 14b for each weighing group, first 11 and second 12, and consequently, for each weighing station, first 15 and second 16. However, according to other, not shown embodiments of the distributor unit D, each weighing group can be equipped with a plurality of weighing areas 14a, 14b for weighing more containers C at a time.

According to FIG. 2b, each weighing area 14a, 14b includes one seat, 140a and 140b, respectively, which houses a corresponding container C being weighed.

A unit 141a and 141b is associated to the seat 140a, 140b, respectively, for acquiring the weight of the container C.

Each of the above weighing stations, first 15 and second 16, features a transfer group 30, which is situated over and crosswise, as shown in FIGS. 2a and 2b, with respect to the direction Z, indicated in FIG. 1, along which the containers C move forward on the conveying line L.

The transfer group 30 extends from the first weighing group 11 to the second weighing group 12 of the relative weighing station 15 or 16.

FIGS. 3a and 3b show a typical step of the conveying line L forward movement and a weighing station 15, 16, associated thereto.

As shown in the above Figures, the transfer group 30 transfers contemporarily containers $C_i$ to be weighed, moved by the conveying line L in the region of the weighing station 15 or 16 toward the second weighing group 12 of the same weighing station 15 or 16, and the weighed containers $C^*_{i-1}$, situated on the first weighing group 11 of the weighing station 15 or 16 toward the conveying line L (arrow T1) crosswise to the direction Z.

As it appears in FIGS. 3c and 3d, which show a further typical step of the conveying line L forward movement and the weighing station 15, 16, associated thereto, the same transfer group 30 transfers simultaneously further containers $C_{i+1}$ to be weighed, moved by the conveying line L in the region of the weighing station 15, 16 toward the first weighing group 11 of the same weighing station 15, 16, and the weighed containers $C^*_i$, from the second weighing group 12 toward the conveying line L (arrow T2) crosswise to the direction Z.

For sake of clarity, in the above description and the enclosed figures, $C_i$ indicates containers to be weighed, and i=1, . . . , N indicate containers fed by the conveying line L toward the weighing station 15, 16, where N indicates the progressive number of the containers conveyed by the conveying line L, and $C^*_i$ indicates the weighed containers leaving the weighing station 15, 16 toward the conveying line L.

As seen for example in FIGS. 2a, 2b, each transfer group 30 is equipped with a relative pair 32 of clamping grippers 31 carried by driving means 33.

The driving means 33 are slidably coupled with guiding means 34 to drive the pair 32 of clamping grippers 31 to reciprocate crosswise to the direction Z (arrow F in FIG. 2a).

In particular, the distance between the above mentioned clamping grippers 31 of each pair 32 corresponds to the distance between the weighing area 14, respectively 14a and 14b of each weighing group, first 11 and second 12, respectively, and the conveying line L.

According to the non limitative example shown in the above mentioned Figures, the transfer group 30 associated to the weighing stations, first 15 and second 16, is equipped with only one weighing area, respectively 14a and 14b, for each weighing group, first 11 and second 12, respectively, and includes only one pair 32 of clamping grippers 31.

If the weighing groups 11, 12 are equipped with a plurality of weighing areas, the transfer group 30 associated thereto will include a number of pairs 32 of clamping grippers 31, which will correspond to the number of the weighing areas.

The proposed distributor unit D includes also a control unit U (FIG. 1), which is interfaced with the first weighing station 15 for acquisition of the empty containers C weight, as well as with the second weighing station 16 for acquisition of the corresponding filled containers C weight.

The control unit U operates the conveying line L controlling the stepwise forward motion. The step of the conveying line movement is determined by the number of the weighing areas of each weighing group 11, 12 of the weighing stations 15, 16.

Thus, each empty container C leaving the first weighing station 15 is weighed and two values related thereto are stored in the control unit U: the first value is the $i^{th}$ position coordinate of the empty container C along the line L and the second is the container weight.

In this way, on the basis of the $i^{th}$ position coordinate, the control unit U can recognize different containers C leaving the filling unit G, while they are passing through the second weighing station 16 and can associate the corresponding weight values to the containers filled with the selected substance.

Therefore, the control unit U stores two different weight values for each filled container C leaving the second weighing station 16, one corresponding to the weight of the empty container C and the other corresponding to the filled container C.

Thus, the control unit U can calculate the net weight of the substance, with which the containers C have been filled by the filling unit G.

The control unit U is interfaced also with a rejection unit S, which is situated along the conveying line L, downstream of the second weighing station 16, and removes from the conveying line L containers C, which have been filled with a quantity of substance, whose net weight does not fall within the admitted or desired tolerance.

A position sensor 4, also connected with the control unit U, is situated over the conveying line L, near the outlet of the first weighing station 15.

The position sensor 4 counts the forward steps and verifies the correct stepwise forward movement of the conveying line L.

The position sensor 4 monitors also the correct positioning of the empty containers C, fed to the filling unit G by the conveying line L, after they have been weighed.

Now, the operation of the proposed distributor unit D is described, with particular reference to the Figures from 4a to 4d.

Figures from 4a to 4d show in an extremely schematic way, an example of a weighing station 15, 16 associated to the conveying line L.

In the following description of the distributor unit D operation, the weighing illustrated station will be e.g. the first weighing station 15.

Before operating the conveying line L, the operator place an empty container $C^*_0$ in the area 14a of the first weighing group 11 of the first weighing station 15.

Likewise, a filled container C (not shown) is placed in the area 14b of the first weighing group 11 of the second weighing station 16.

Then, the conveying line L is operated and moves stepwise in the forward direction Z.

In the shown example case, each weighing group 11, 12 is equipped with only one weighing area and each forward step of the conveying line L corresponds to the distance between the middle axes of two subsequent containers.

When the empty container C1 to be weighed reaches the first weighing station 15 (FIG. 4a), brought thereto by the stepwise movement of the conveying line L, the transfer group 30 is operated.

The container C1 to be weighed, situated on the conveying line L in correspondence to the first weighing station 15, is transferred, by the relative pair 32 of clamping grippers 31 of the transfer group 30, to the seat 14b of the second weighing group 12, and at the same time, the weighed container $C^*_0$, situated on the area 14a of the first weighing group 11 is transferred, by the transfer group 30 to the conveying line L (FIG. 2b, FIG. 4b arrow T1).

In step relation with the end of the transfer operation, the control unit U operates the line L to move one step forward (FIG. 4c, arrow Z), so as to bring the next empty container $C_2$ to be weighed to the first weighing station 15.

During the forward movement of the line L, the weighing seat 14b of the second weighing group 12 acquires the weight of the container $C^*_1$, situated thereon.

Then, the acquired weight value is stored in the control unit U in combination with a position coordinate, which individuates the position of the just weighed container on the conveying line L.

The transfer group 30 is operated at the subsequent stop of the conveying line L, so that the container $C_2$ to be weighed, situated on the conveying line L in the region of the first weighing station 15, is transferred, by the relative pair 32 of clamping grippers 31 of the transfer group 30, to the seat 14a of the first weighing group 11, previously emptied.

At the same time, the weighed container $C^*_1$, situated on the area 14b of the second weighing group 12 is transferred, by the transfer group 30 to the conveying line L (FIG. 4d arrow T2).

In step relation with the completion of the transfer, the control unit U operates the line L to move one step forward (FIG. 4c, arrow Z), so as to bring next empty container $C_2$ to be weighed to the first weighing station 15.

The above operations are repeated sequentially and the control unit U stores the weight values of the subsequent containers C fed to and passing through the filling unit G.

Moreover, each weighed empty container is given a corresponding position identifying coordinate.

The position sensor 4 checks the correct position of the weighed empty containers $C^*$ on the conveying line L leaving the first weighing station 15.

The sequence of the above described operation steps is repeated, in the same way, in the second weighing station 16 situated downstream of the filling unit G.

Thus, the control unit U stores the weight values of the filled containers C leaving the second weighing station 16.

The control unit U can calculate the net weight of the substance introduced into the containers and verify if it falls within the admitted tolerance by recognizing different containers on the ground of their position identifying coordinate.

If there is a container filled with the substance, whose net weight does not fall into the allowed tolerance, the rejection unit S is operated by the control unit U and the container is removed and rejected.

Therefore, the proposed distributor unit D enables acquisition and determination, with absolute precision, of the net weight of the substance introduced into the containers C fed by the conveying line L.

It is to be pointed out that the acquisition and determination of the net weight of the substance introduced into the containers C takes place completely out of the conveying line, which advantageously avoids weighing inertia problem.

Another advantage of the proposed distributor unit D derives from the fact that the weighing stations include extremely functional, and simple elements, whose number is limited, thus reducing the production costs.

The weighing stations allow to remove the containers to be weighed from the conveying line, to weigh the removed containers and to reintroduce the weighed containers to the conveying line, without slowing down the conveying line forward movement, which permits to maintain best production rate.

Moreover, the proposed distributor unit D enables removal and rejection of containers filled with a quantity of substance having a net weight which does not fall within the admitted tolerance.

Therefore, it is obvious that the proposed distributor unit allows to acquire the net weight of the substance introduced into the containers completely out of the conveying line by a sequence of extremely efficient and easy operations.

What is claimed is:

1. A liquid substance distributor unit (D) including:
   a conveying line (L), which moves forward stepwise, so as to convey containers (C) in a forward direction (Z);
   at least one filling unit (G), where said containers (c) are filled with a liquid substance;
   at least one weighing station (15,16), associated to said conveying line (L);
   said distributor unit (D) being characterized in that said weighing station includes, in combination:
   at least one first weighing station (15), situated upstream of said filling unit (G) with respect to said forward direction (Z) of said line (L), so as to weigh the containers ($C_{IN}$) before filling;
   at least one second weighing station (16), situated downstream of said filling unit (G), with respect to said forward direction (Z) of said line (L), so as to weigh containers ($C_{OUT}$) after filling;
   a control unit (U), interfaced with said first weighing station (15) and with said second weighing station (16), so as to acquire the weight of said containers (C), respectively before and after filling, and determine the net weight of the substance introduced in each container;
   with each one of the above mentioned first and second weighing stations (15,16) including:
      a first weighing group (11) and a second weighing group (12) situated on opposite sides of said conveying line (L);
      at least one weighing area (14a,14b) for each of said first weighing group (11) and second weighing group (12), for weighing a container (C) conveyed by the conveying line (L);
      at least one transfer group (30) for transferring, during a conveying line (L) stop, containers ($C_i$) to be weighed from said conveying line (L) to the weighing area (14b) of said second weighing group (12), and for transferring, at the same time, an already weighed containers ($C^*_{i-1}$) from the first weighing group (11) to said conveying line (L);
      said transfer group (30) transferring, during a next stop of said conveying line (L), further containers ($C_{i+1}$) to be weighed from said conveying line (L) to the weighing area (14a) of said first weighing group (11), and transferring at the same time, an already weighed containers ($C^*_i$) from said weighing area (14b) of said second weighing group (12) to said conveying line (L).

2. A distributor unit, as claimed in claim 1, wherein each of said first weighing group (11) and second weighing group (12) of said weighing stations (15,16) includes a selected number of weighing areas (14a,14b) and said conveying line (L) is controlled by said control unit (U) so as to move stepwise in relation to said selected number of weighing areas (14a,14b).

3. A distributor unit, as claimed in claim 1, further including a rejection unit (S), situated downstream of said second weighing station (16) with respect to said forward direction (Z) of said line (L) and interfaced with said control unit (U), so as to remove and reject from the conveying line (L) containers (C) filled with substance and having said net weight out of an admitted tolerance stored in said control unit (U).

4. A distributor unit, as claimed in claim 1, further including sensor means (4) for detecting the position of said containers (C) on said conveying line (L) and for counting forward movement steps of said line; said sensor means (4) being connected to said control unit (U).

5. A distributor unit, as claimed in claim 1, wherein said transfer group (30) includes:
   at least one pair (32) of clamping grippers (31) for gripping containers (C), said pair (32) being associated with a relative weighing area (14a,14b);
   driving means (33) slidably coupled with guiding means (34) for driving said pair (32) of clamping grippers (31) with a reciprocatory movement in a direction (F) crosswise to the forward direction (Z) of said conveying line (L).

6. A distributor unit, as claimed in claim from 1, wherein each weighing area (14a,14b) includes a relative seat (140a, 140b) for housing one container (C) to be weighed, each of said seats (140a,140b) being equipped with a relative acquiring unit (141a,141b) for acquiring the weight of said container (C).

* * * * *